UNITED STATES PATENT OFFICE.

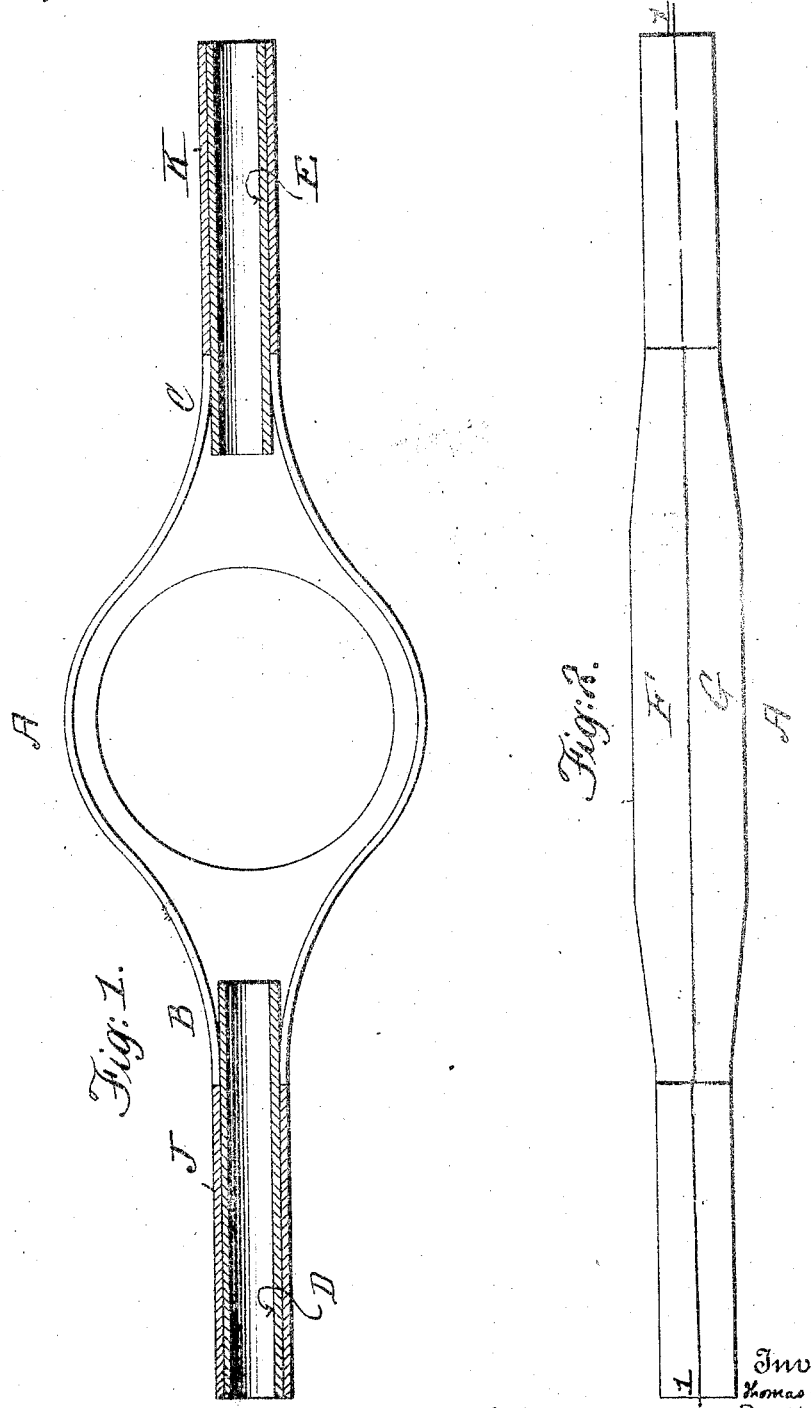

THOMAS E. MURRAY, JR., AND JOSEPH B. MURRAY, OF BROOKLYN, NEW YORK.

HOUSING FOR TRANSMISSION GEARS AND AXLES OF AUTOMOBILES.

1,363,155.     Specification of Letters Patent.     Patented Dec. 21, 1920.

Application filed February 20, 1920. Serial No. 360,063.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Housings for Transmission Gears and Axles of Automobiles, of which the following is a specification.

The invention relates to a housing for the transmission gear and axle of an automobile and consists in the construction of said housing. The object is to simplify and cheapen said construction.

In the accompanying drawing—

Figure 1 is a longitudinal section of our housing on the line 1—1 of Fig. 2. Fig. 2 is an edge view.

Similar letters of reference indicate like parts.

A is the middle section of the housing which is preferably made of sheet metal. Said section in form is substantially annular with oppositely disposed tapered tubular extensions B, C. When the housing is in place the annular portion of section A incloses the transmission gear, and the axle driven thereby passes through the extensions B, C, and also through the tubes D and E which are united respectively to said extensions. The middle section A is formed of two like longitudinal half sections F and G, struck-up, pressed or stamped from sheet metal, which are electrically welded together at their registering edges, one of the welded joints being shown at H, Fig. 2.

The tubes D and E enter the tapered extensions B, C, and are preferably electrically welded thereto. Inclosing the tubes D and E are reinforcing tubes J, K, the ends of which make contact and register with the ends of said extensions, and are preferably butt-welded thereto. Said inclosing tubes J, K, may also be electrically welded to the tubes D, E. Because the half sections F, G are electrically welded together along their registering edges, we are enabled to secure the tubes D, E in the tapered extensions B, C by the same welding operation.

We claim:

1. A housing for transmission gear and axle comprising a middle section in form substantially annular with oppositely disposed tubular extensions, tubes respectively entering said extensions and electrically welded thereto, the said middle section being formed in two longitudinal half sections electrically welded together at their registering edges, and reinforcing tubes inclosing and united to said first-named tubes and in registering contact at their ends with the ends of said extensions.

2. A housing for transmission gear and axle comprising a middle section in form substantially annular with oppositely disposed tubular extensions, tubes respectively entering said extensions and electrically welded thereto, the said middle section being formed in two longitudinal half sections electrically welded together at their registering edges, and reinforcing tubes inclosing said first-named tubes and butt-welded at their ends to the ends of said extensions.

In testimony whereof we have affixed our signatures in presence of two witnesses.

THOMAS E. MURRAY, Jr.
JOSEPH B. MURRAY.

Witnesses:
GERTRUDE T. PORTER,
MAY T. MCGARRY.